United States Patent
Shibuya

(10) Patent No.: US 10,384,099 B2
(45) Date of Patent: Aug. 20, 2019

(54) MOTION ANALYSIS METHOD AND DISPLAY METHOD

(71) Applicant: SEIKO EPSON CORPORATION, Tokyo (JP)

(72) Inventor: Kazuhiro Shibuya, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 46 days.

(21) Appl. No.: 15/888,580

(22) Filed: Feb. 5, 2018

(65) Prior Publication Data
US 2018/0221711 A1   Aug. 9, 2018

(30) Foreign Application Priority Data

Feb. 6, 2017   (JP) .................................. 2017-019306

(51) Int. Cl.
| | | |
|---|---|---|
| A63B 24/00 | (2006.01) | |
| A63B 69/36 | (2006.01) | |
| G09B 19/00 | (2006.01) | |
| G01P 15/08 | (2006.01) | |
| A63B 71/06 | (2006.01) | |

(52) U.S. Cl.
CPC ...... *A63B 24/0006* (2013.01); *A63B 69/3632* (2013.01); *A63B 71/0622* (2013.01); *G01P 15/0888* (2013.01); *G09B 19/0038* (2013.01); *A63B 2024/0009* (2013.01); *A63B 2071/0636* (2013.01); *A63B 2220/833* (2013.01)

(58) Field of Classification Search
CPC ............ A63B 24/0006; A63B 69/3632; A63B 71/0622; G01P 15/0888; G09B 19/0038
See application file for complete search history.

(56) References Cited

U.S. PATENT DOCUMENTS

| | | | |
|---|---|---|---|
| 2006/0166737 A1* | 7/2006 | Bentley ................ | A61B 5/1122 463/30 |
| 2012/0316005 A1 | 12/2012 | Shibuya | |
| 2015/0012240 A1 | 1/2015 | Sato | |
| 2017/0203187 A1* | 7/2017 | Ito ....................... | G06F 16/2272 |
| 2017/0203211 A1* | 7/2017 | Kiryu ................... | A63F 13/211 |
| 2017/0239520 A1* | 8/2017 | Kodaira ............ | A63B 71/0622 |
| 2017/0312573 A1* | 11/2017 | Thornton ............... | A63B 69/36 |

FOREIGN PATENT DOCUMENTS

| | | |
|---|---|---|
| JP | 2008-073210 A | 4/2008 |
| JP | 2012-254206 A | 12/2012 |
| JP | 2015-013007 A | 1/2015 |
| JP | 2017-046732 A | 3/2017 |
| JP | 2017046732 A * | 3/2017 |

\* cited by examiner

*Primary Examiner* — Jamel E Williams
(74) *Attorney, Agent, or Firm* — Oliff PLC

(57) ABSTRACT

A motion analysis method includes a normal mode in which first motion information in a swing is measured by using an output from a sensor unit in a state in which a standing still action is detected, and a simple mode in which second motion information in a swing is measured by using an output from the sensor unit in a state in which the standing still action is not detected, and the number of analysis items is smaller than in the normal mode.

9 Claims, 10 Drawing Sheets

MOTION ANALYSIS METHOD AND DISPLAY METHOD

BACKGROUND

1. Technical Field

The present invention relates to a motion analysis method and a display method.

2. Related Art

In the related art, there is a camera system in which a swing in golf is imaged with a camera, and the swing is analyzed on the basis of a captured image, but, since the camera system requires a large-scale device, it is necessary to select an installation location of the device, and thus measurement cannot be easily performed, and convenience is reduced.

In contrast, JP-A-2015-13007 has proposed an apparatus in which a three-axis acceleration sensor and a three-axis gyro sensor are attached to a golf club, and a swing is analyzed by using outputs from such inertial sensors. Therefore, if the apparatus is used, a camera is not necessary, and thus convenience is improved. An address attitude in which an attitude of a subject or a golf club stands still before a swing is detected, a swing is analyzed on the basis of the address attitude (initial attitude), and thus an analysis result with high accuracy can be obtained.

However, in a motion analysis method disclosed in JP-A-2015-13007, in a case where repetitive swings are performed, an initial attitude is detected every time, so that a standing still state is necessary for several seconds, and correcting a swing by referring to an analysis result requires time and is cumbersome.

SUMMARY

An advantage of some aspects of the invention is to solve at least a part of the problems described above, and the invention can be implemented as the following forms or application examples.

Application Example 1

A motion analysis method according to this application example includes a first mode in which first motion information in a swing is measured by using an output from an inertial sensor in a state in which a standing still action is detected; and a second mode in which second motion information in a swing is measured by using an output from the inertial sensor in a state in which the standing still action is not detected, and the number of analysis items is smaller than in the first mode.

According to this application example, in the second mode in which the second motion information in a swing is measured, the number of analysis items is smaller than in the first mode in which the first motion information is measured, and thus the second motion information can be measured in a shorter period of time than in the first mode. Thus, since a highly accurate swing analysis result based on the first motion information and a swing analysis result based on the second motion information measured for a short period of time can be compared with each other in a short period of time. Therefore, there is an effect that a swing can be corrected in a short period of time. In a case where measurement is repeatedly performed in the second mode, it is possible to compare swing analysis results with each other in a shorter period of time.

Application Example 2

In the motion analysis method according to the application example, it is preferable that the first motion information and the second motion information are output in the same coordinate system.

According to this application example, the first motion information and the second motion information are output in the same coordinate system, and thus the first motion information and the second motion information can be easily compared with each other. In other words, since a swing analysis result based on the first motion information and a swing analysis result based on the second motion information are output in the same coordinate system, both of the swing analysis results can be easily compared with each other, and thus a difference between both of the swing analysis results can be accurately checked.

Application Example 3

In the motion analysis method according to the application example, it is preferable that angle information included in the first motion information and angle information included in the second motion information are standardized and are output.

According to this application example, since angle information included in the first motion information and angle information included in the second motion information are standardized and is output, the first motion information and the second motion information can be compared with each other on the basis of the angle information, and thus it is possible to more accurately check a difference between the first motion information and the second motion information.

Application Example 4

In the motion analysis method according to the application example, it is preferable that the angle information indicates a target direction in the swing.

According to this application example, since the angle information indicates a target direction in a swing, and thus the first motion information and the second motion information can be compared with each other with respect to target directions in the swings, and thus a difference between both of the target directions can be recognized.

Application Example 5

In the motion analysis method according to the application example, it is preferable that the standardized angle information indicates a value of angle information in a predetermined swing.

According to this application example, the standardized angle information indicates a value of angle information in a predetermined swing, and thus it is possible to more accurately check a difference between swings.

Application Example 6

A display method according to this application example includes a first mode in which first motion information in a swing is measured by using an output from an inertial sensor; and a second mode in which second motion information in a swing is measured by using an output from the inertial sensor, and the number of analysis items is smaller than in the first mode, in which the first motion information and the second motion information are displayed in the same coordinate system.

According to this application example, the first motion information and the second motion information are displayed in the same coordinate system, and thus the first motion information and the second motion information can be easily compared with each other. In other words, since a swing analysis result based on the first motion information and a swing analysis result based on the second motion information can be viewed together, both of the swing analysis results can be easily compared with each other, and thus a difference between both of the swing analysis results can be accurately checked.

Application Example 7

In the display method according to the application example, it is preferable that each of the first motion information and the second motion information in a predetermined swing is displayed in an emphasis manner.

According to this application example, since motion information in a predetermined swing is displayed in an emphasis manner, the predetermined swing can be easily recognized, and can thus be easily compared with other swings.

Application Example 8

In the display method according to the application example, it is preferable that a number or a symbol is added to each of the first motion information and the second motion information in an order of the swing.

According to this application example, a number or a symbol is added to the motion information in an order of the swing, and thus it is possible to sequentially recognize differences among swings from an initial swing to a last swing.

Application Example 9

In the display method according to the application example, it is preferable that each of the first motion information and the second motion information is thinly displayed in an order of the swing.

According to this application example, the motion information is thinly displayed in an order of the swing, and thus it is possible to sequentially recognize differences among swings from an initial swing to a last swing.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the drawings. The embodiments described below are not intended to improperly limit the content of the invention disclosed in the appended claims. In addition, all constituent elements described below are not essential constituent elements of the invention.

Figure 1:
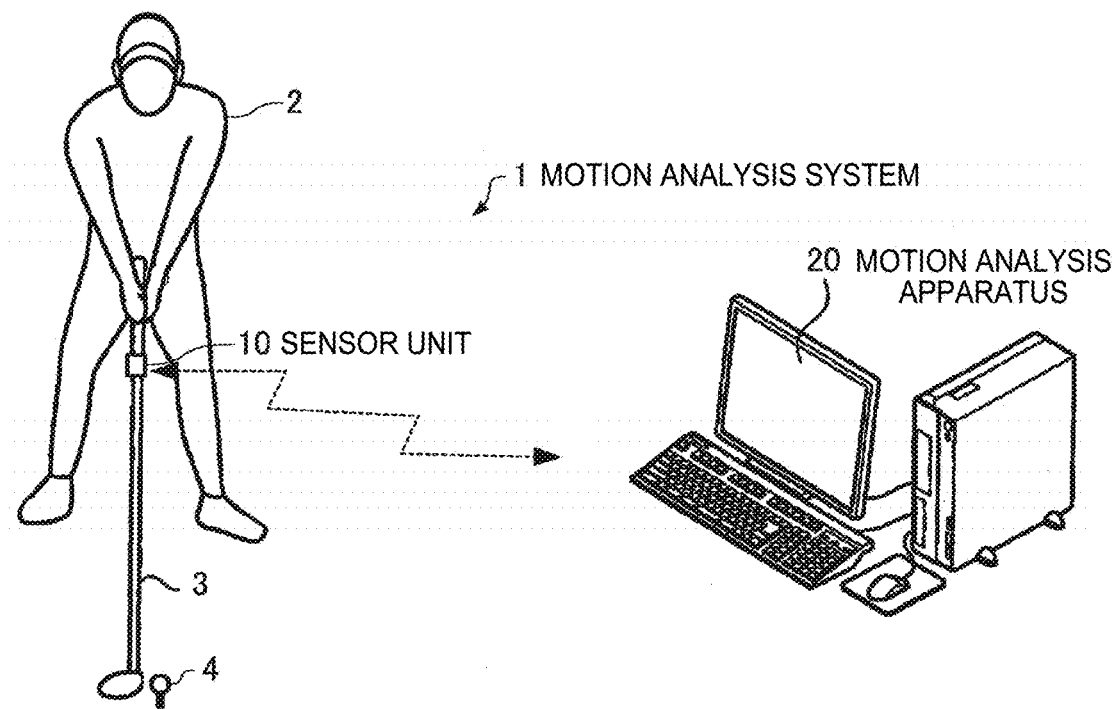
FIG. 1 is a diagram illustrating a summary of a motion analysis system in a motion analysis method according to the present embodiment.
Figure 2:
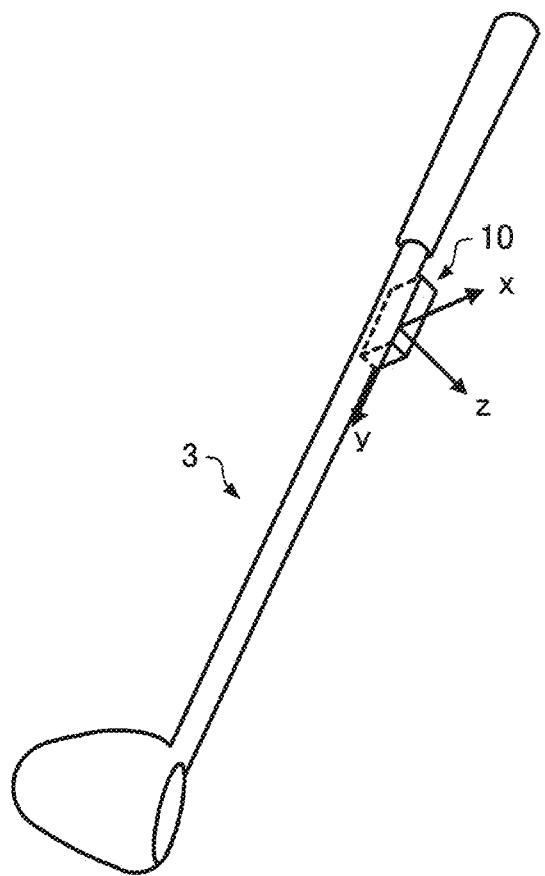
FIG. 2 is a diagram illustrating examples of a position at which and a direction in which the sensor unit is attached.

Hereinafter, as an example, a description will be made of a motion analysis method using a motion analysis system (motion analysis apparatus) performing analysis of a golf swing.
Motion Analysis System First, a description will be made of a summary of a motion analysis system in the motion analysis method according to the present embodiment with reference to FIGS. 1 and 2.
Summary of Motion Analysis System FIG. 1 is a diagram illustrating a summary of a motion analysis system in the motion analysis method according to the present embodiment. FIG. 2 is a diagram illustrating examples of a position at which and a direction in which the sensor unit is attached.

A motion analysis system 1 used for the motion analysis method of the present embodiment is configured to include, as illustrated in FIG. 1, a sensor unit 10 (an example of an inertial sensor) and a motion analysis apparatus 20.

The sensor unit 10 can measure acceleration generated in each axial direction of three axes and angular velocity generated around each of the three axes, and is attached to a golf club 3 (an example of an exercise appliance) as illustrated in FIG. 1.

As illustrated in FIG. 2, the sensor unit 10 is attached to a part of a shaft of the golf club 3 so that one axis of three detection axes (an x axis (an example of a second detection axis), a y axis (an example of a first detection axis), and a z axis (an example of a third detection axis)), for example, the y axis matches a long axis direction of the shaft. Preferably, the sensor unit 10 is attached to a position close to a grip to which impact during ball hitting is hardly forwarded and a centrifugal force is not applied during a swing. The shaft is a portion other than a head of a golf club 3 and also includes the grip.

Figure 3:
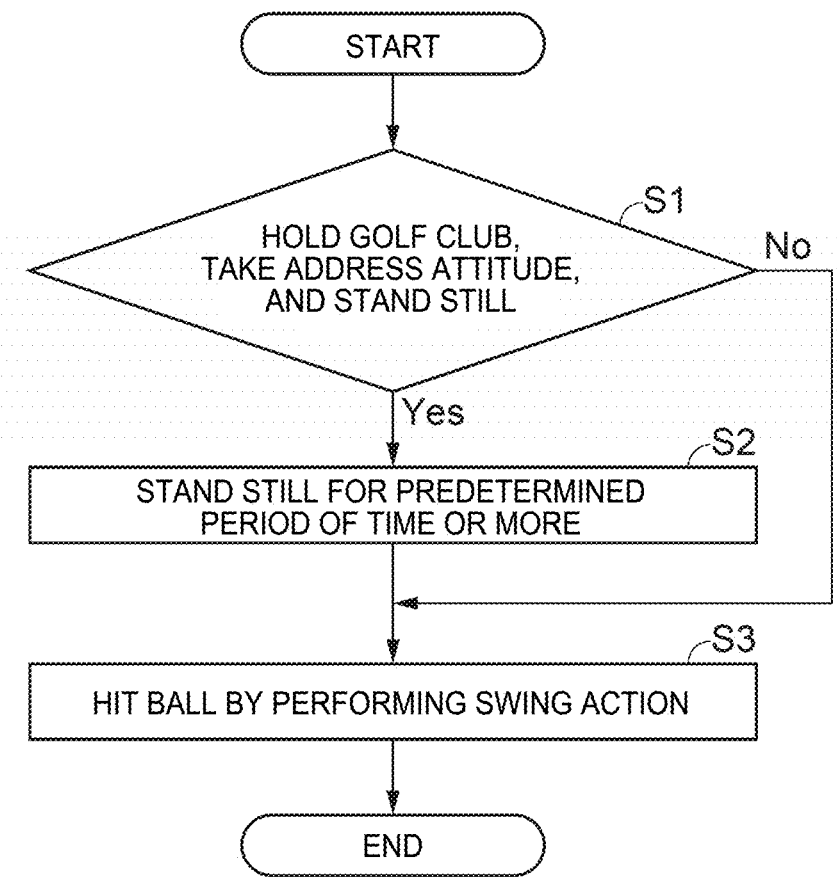
FIG. 3 is a diagram illustrating procedures of actions performed by a subject in the present embodiment.

A subject 2 performs a swing action for hitting a golf ball 4 according to predefined procedures. FIG. 3 is a diagram illustrating procedures of actions performed by the subject 2. As illustrated in FIG. 3, first, the subject 2 holds the golf club 3, takes an address attitude, and stands still (S1). Next, in a case where the subject 2 stands still (YES), the subject 2 stands still for a predetermined period of time or more (for example, one second or more) (S2). Then, the subject 2 performs a swing according to so as to hit the golf ball 4 (S3). This is a first mode of the motion analysis method of the present embodiment, and will be referred to as a normal mode.

In a case where the subject 2 does not stand still at the address attitude (NO), the subject 2 performs a swing according to so as to hit the golf ball 4 (S3). This is a second mode of the motion analysis method of the present embodiment, and will be referred to as a simple mode.

In the normal mode, a swing action is analyzed by using initial attitude information, and thus analysis accuracy increases. In contrast, in the simple mode, initial attitude information is not acquired, and thus a swing action can be analyzed in a short period of time, but analysis accuracy is low since the number of analysis items is small. Therefore, the motion analysis method of the present embodiment includes both of the normal mode in which analysis accuracy is high and the simple mode in which analysis accuracy is low but measurement can be performed in a short period of time.

While the user 2 performs an action of hitting the golf ball 4 according to the procedures illustrated in FIG. 3, the sensor unit 10 measures three-axis accelerations and three-axis angular velocities in a predetermined cycle (for example, 1 ms), and sequentially transmits the measured data to the motion analysis apparatus 20. The sensor unit 10 may immediately transmit the measured data, and may store the measured data in an internal memory, and may transmit the measured data at a desired timing such as the time after a swing action of the user 2 is finished. Alternatively, the sensor unit 10 may store the measured data in a detachable recording medium such as a memory card, and the motion analysis apparatus 20 may read the measured data from the recording medium.

In a case of the normal mode in the motion analysis method of the present embodiment, the motion analysis apparatus 20 computes a rotation angle of the shaft of the golf club 3 about the long axis thereof or an inclined angle of the shaft when the subject 2 holds the golf club 3 (at address) by using data measured by the sensor unit 10, and generates initial attitude information of the golf club 3 by using the rotation angle or the inclined angle. The initial attitude information of the golf club 3 may include some or all of a lie angle (an inclined angle of the shaft of the golf club 3), a face angle (an azimuth angle of a face of the golf club 3), and a loft angle (an inclined angle of the face of the golf club 3) at address of the subject 2.

The motion analysis apparatus 20 analyzes a swing (first motion information) in which the subject 2 hit the ball with the golf club 3 by using the initial attitude information of the golf club 3 and the data measured by the sensor unit 10.

The motion analysis apparatus 20 generates advice information regarding an attitude (address attitude) of the subject 2 by using the initial attitude information of the golf club 3, and presents the advice information to the subject 2 as an image, voices, vibration, or the like.

Next, in a case of the simple mode, a swing (second motion information) in which the subject 2 hit the ball with the golf club 3 is analyzed by using data measured by the sensor unit 10.

In a case where analysis is repeatedly performed in the normal mode and the simple mode, analysis of a swing (second motion information) in the simple mode may be performed by using initial attitude information obtained in the normal mode.

Communication between the sensor unit 10 and the motion analysis apparatus 20 may be wireless communication, and may be wired communication.

Figure 4A:
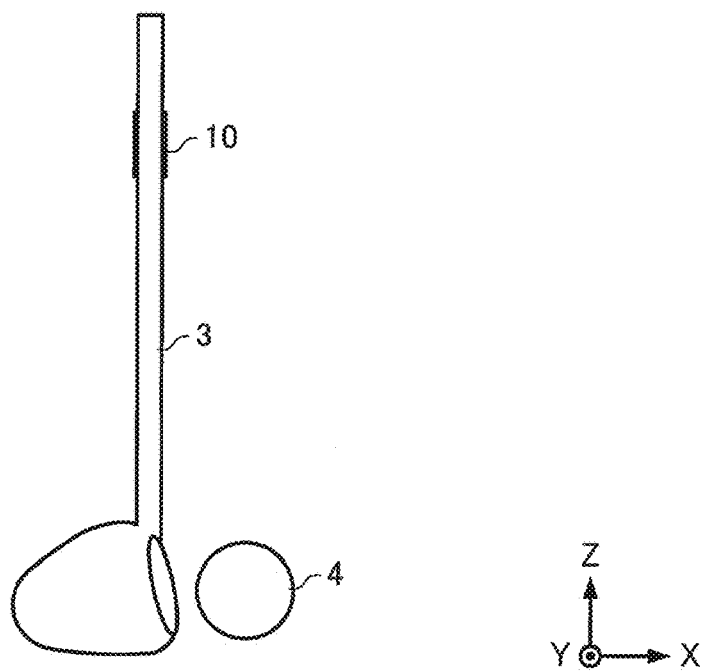
FIG. 4A is a diagram illustrating an example of an initial attitude of a golf club.
Figure 4B:
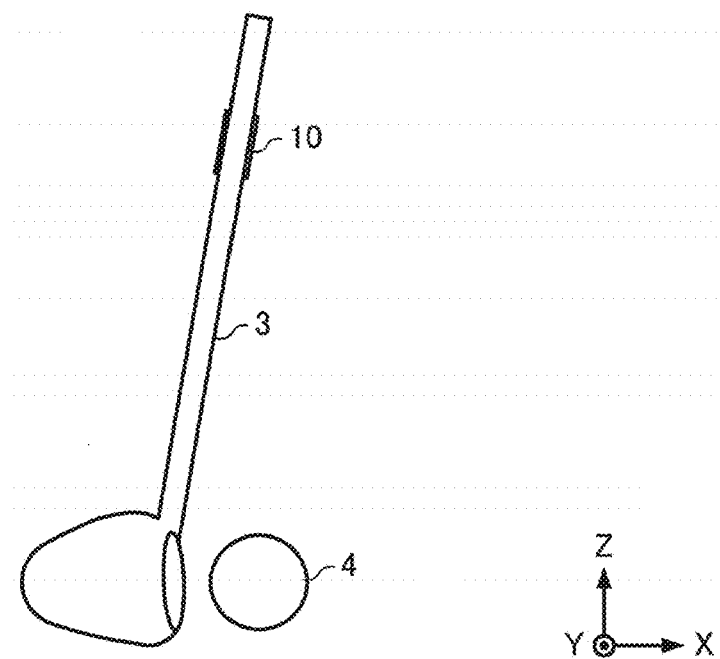
FIG. 4B is a diagram illustrating an example of an initial attitude of a golf club.

FIGS. 4A and 4B are diagrams illustrating examples of an initial attitude of the golf club 3. In the present embodiment, an XYZ coordinate system (world coordinate system) is defined which has a target line indicating a target hit ball direction as an X axis, an axis on a horizontal plane which is perpendicular to the X axis as a Y axis, and a vertically upward direction (a direction opposite to the gravitational direction) as a Z axis, and FIGS. 4A and 4B illustrate the X axis, the Y axis, and the Z axis. The target line indicates, for example, a direction in which a ball flies straight. FIGS. 4A and 4B are diagrams in which the golf club 3 and the golf ball 4 are projected onto an XZ plane. FIG. 4A is a diagram illustrating a case where the subject 2 takes an address attitude such that the long axis of the shaft of the golf club 3 is perpendicular to the target hit ball direction. On the other hand, FIG. 4B is a diagram illustrating a case where the subject 2 takes an address attitude such that the grip of the golf club 3 is located further toward the ball hitting direction than the head, that is, the subject 2 holds the golf club 3 in a hands-forward state by raising a loft of the golf club 3.

Figure 5A:
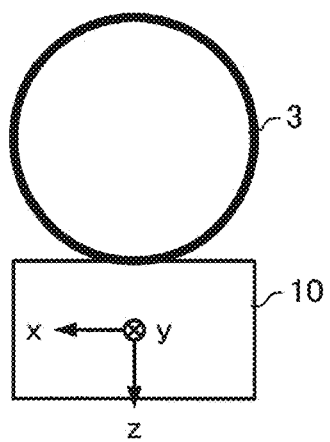
FIG. 5A is a sectional view in which the golf club and the sensor unit in FIGS. 4A and 4B are cut in a plane which is perpendicular to a long axis of a shaft.
Figure 5B:
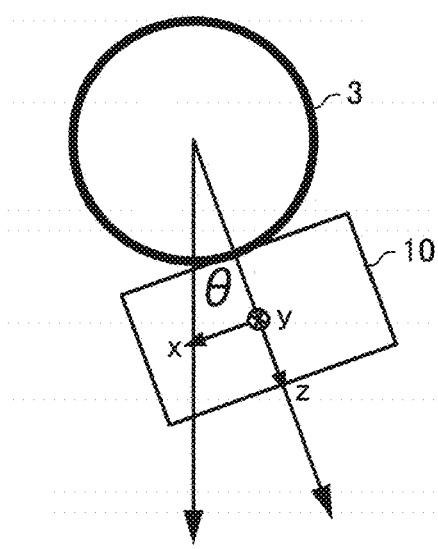
FIG. 5B is a sectional view in which the golf club and the sensor unit in FIGS. 4A and 4B are cut in a plane which is perpendicular to a long axis of the shaft.

FIGS. 5A and 5B are sectional views in which the golf club 3 and the sensor unit 10 are cut in a plane perpendicular to the long axis of the shaft with respect to FIGS. 4A and 4B. In a case where the subject 2 takes the hands-forward attitude as in FIG. 4B, and in a case where the subject takes the attitude as in FIG. 4A, the golf club 3 is rotated by an angle θ corresponding to the extent of the hands-forward attitude about the long axis of the shaft.

An inclination of the shaft of the golf club 3 with respect to the gravitational direction can be specified by using measured data in the inertial sensor, but an angle in the direction perpendicular to the gravitational direction, that is, an azimuth angle cannot be specified. Thus, in the normal mode, for example, an axis obtained by projecting the x axis of the sensor unit 10 onto a horizontal plane is used as the X axis (azimuth angle of 0°) assuming that the x axis of the sensor unit 10 is directed in the target hit ball direction at address of the subject 2. In this case, if the subject 2 takes the hands-forward attitude at address as in FIG. 4B, the x axis of the sensor unit 10 is not directed in the target hit ball direction, and thus the accuracy of swing analysis may deteriorate.

In the motion analysis method of the present embodiment, as illustrated in FIG. 2, the y axis matches the long axis direction of the shaft of the golf club 3, and the sensor unit 10 is attached to the golf club 3. An attitude of the golf club 3 when the subject 2 takes the address attitude as in FIG. 4A, that is, an attitude of the golf club 3 when the shaft stands to be perpendicular to the target hit ball direction is defined as a reference attitude. Therefore, if an initial attitude of the golf club 3 is a reference attitude, as illustrated in FIG. 5A, a rotation angle of the shaft about the long axis thereof at an initial attitude with respect to the reference attitude of the golf club 3 is 0°. In the sensor unit 10, the y axis is directed in the long axis direction, the x axis is directed in the target hit ball direction, and the z axis is directed in the downward direction orthogonal to the x axis and the y axis. Therefore, the x axis is horizontal. Thus, a measured value of the gravitational acceleration in the x axis direction is zero. On the other hand, in a case where the subject 2 takes the hands-forward attitude at address as illustrated in FIG. 4B, as illustrated in FIG. 5B, a rotation angle θ of the shaft about the long axis thereof at the initial attitude with respect to the reference attitude of the golf club 3 is not zero, and thus a gravitational acceleration in the x axis direction is measured. Therefore, in the simple mode of the motion analysis method of the present embodiment, the motion analysis apparatus 20 computes the rotation angle θ by using measured data (measured data of the gravitational acceleration) in the sensor unit 10 at the time at which the subject 2 starts a swing, so as to specify an initial attitude (an attitude at the time of starting a swing) of the golf club 3. Consequently, the motion analysis apparatus 20 can perform swing analysis with high accuracy with an attitude at the time of starting a swing as a reference attitude (an angle of the face of the golf club is zero with respect to the target line).

Configuration of Motion Analysis System

Figure 6:
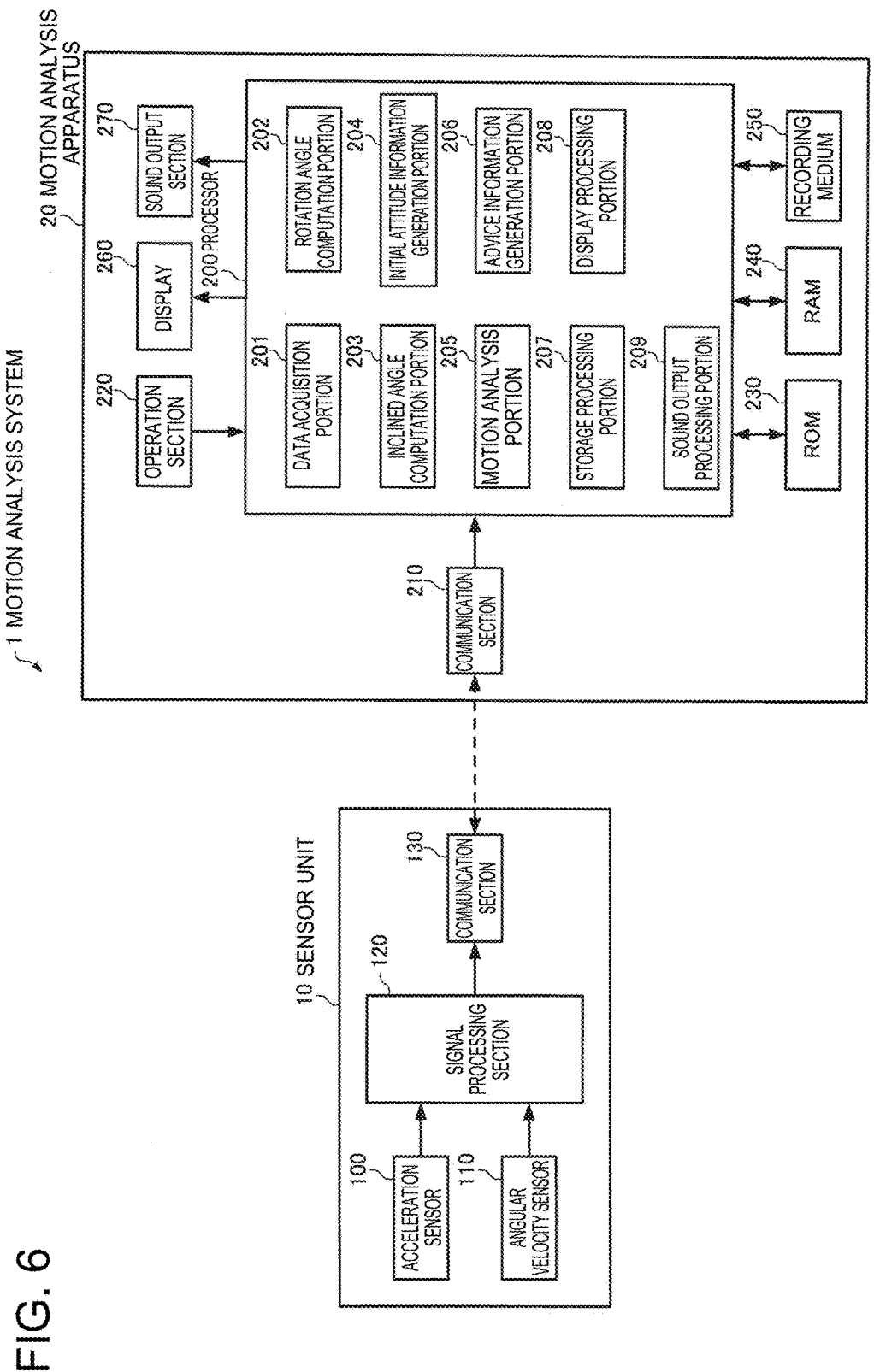
FIG. 6 is a configuration example of the motion analysis system in the motion analysis method according to the present embodiment.

FIG. 6 is a diagram illustrating configuration examples of the sensor unit 10 and the motion analysis apparatus 20. As illustrated in FIG. 6, in the present embodiment, the sensor unit 10 is configured to include an acceleration sensor 100, an angular velocity sensor 110, a signal processing section 120, and a communication section 130.

The acceleration sensor 100 measures respective accelerations in three axial directions which intersect (ideally, orthogonal to) each other, and outputs digital signals (acceleration data) corresponding to magnitudes and directions of the measured three-axis accelerations.

The angular velocity sensor 110 measures respective angular velocities in three axial directions which intersect (ideally, orthogonal to) each other, and outputs digital signals (angular velocity data) corresponding to magnitudes and directions of the measured angular velocities in the three axial directions.

The signal processing section 120 receives the acceleration data and the angular velocity data from the acceleration sensor 100 and the angular velocity sensor 110, respectively, adds time information thereto, stores the data in a storage portion (not illustrated), adds time information to the stored measured data (acceleration data and angular velocity data) so as to generate packet data conforming to a communication format, and outputs the packet data to the communication section 130.

Ideally, the acceleration sensor 100 and the angular velocity sensor 110 are provided in the sensor unit 10 so that the three axes thereof match three axes (an x axis, a y axis, and a z axis) of an orthogonal coordinate system (sensor coordinate system) defined for the sensor unit 10, but, actually, errors occur in installation angles. Therefore, the signal processing section 120 performs a process of converting the acceleration data and the angular velocity data into data in the xyz coordinate system by using a correction parameter which is calculated in advance according to the installation angle errors.

The signal processing section 120 performs a process of correcting the temperatures of the acceleration sensor 100 and the angular velocity sensor 110. Alternatively, the acceleration sensor 100 and the angular velocity sensor 110 may have a temperature correction function.

The acceleration sensor 100 and the angular velocity sensor 110 may output analog signals, and, in this case, the signal processing section 120 may A/D convert an output signal from the acceleration sensor 100 and an output signal from the angular velocity sensor 110 so as to generate measured data (acceleration data and angular velocity data), and may generate communication packet data by using the data.

The communication section 130 performs a process of transmitting packet data received from the signal processing section 120 to the motion analysis apparatus 20, or a process of receiving a control command from the motion analysis apparatus 20 and sending the control command to the signal processing section 120. The signal processing section 120 performs various processes corresponding to control commands.

The motion analysis apparatus 20 is configured to include a processor 200, a communication section 210, an operation section 220, a ROM 230, a RAM 240, a recording medium 250, a display 260, a sound output section 270, and may be a personal computer (PC) or a portable apparatus such as a smart phone.

The communication section 210 performs a process receiving packet data transmitted from the sensor unit 10 and sending the packet data to the processor 200, or a process of transmitting a control command from the processor 200 to the sensor unit 10.

The operation section 220 performs a process of acquiring operation data from the user and sending the operation data to the processor 200. The operation section 220 may be, for example, a touch panel type display, a button, a key, or a microphone.

The ROM 230 stores a program for the processor 200 performing various calculation processes or a control process, or various programs or data for realizing application functions.

The RAM 240 is used as a work area of the processor 200, and a storage section which temporarily stores a program or data read from the ROM 230, data which is input from the operation section 220, results of calculation performed according to various programs by the processor 200, and the like.

The recording medium 250 is a storage section storing data which is required to be preserved for a long period of time among pieces of data generated through processing of the processor 200. The recording medium 250 may store a program for the processor 200 performing various calculation processes or a control process, or various programs or data for realizing application functions.

In the present embodiment, the ROM 230, the RAM 240, or the recording medium 250 stores specification information (information regarding a length of the shaft, a position of the centroid, a lie angle, a face angle, a loft angle) of the golf club 3, information regarding an attachment position (a distance from the head or the grip end of the golf club 3) of the sensor unit 10, and information regarding a length of the arms or the centroid of the user 2, and such information is used by the processor 200.

The display 260 displays a processing result in the processor 200 as text, a graph, a table, animation, and other images. The display 260 may be, for example, a CRT, an LCD, a touch panel type display, and a head mounted display (HMD). A single touch panel type display may realize functions of the operation section 220 and the display 260.

The sound output section 270 outputs a processing result in the processor 200 as a sound such as a voice or a buzzer sound. The sound output section 270 may be, for example, a speaker or a buzzer.

The processor 200 performs a process of transmitting a control command to the sensor unit 10, various computation processes on data which is received from the sensor unit 10 via the communication section 210, or various control processes, according to programs stored in the ROM 230 or the recording medium 250, or a program which is received from a server via a network and is stored in the RAM 240 or the recording medium 250. Particularly, in the present embodiment, by executing the program, the processor 200 functions as a data acquisition portion 201, a rotation angle computation portion 202, an inclined angle computation portion 203, an initial attitude information generation portion 204, a motion analysis portion 205, an advice information generation portion 206, a storage processing portion 207, a display processing portion 208, and a sound output processing portion 209.

The data acquisition portion 201 performs a process of receiving packet data which is received from the sensor unit 10 by the communication section 210, acquiring time information and measured data in the sensor unit 10 from the received packet data, and sending the time information and the measured data to the storage processing portion 207.

The storage processing portion 207 performs a process of storing the time information and the measured data received from the data acquisition portion 201 in the RAM 240 in correlation with each other.

The rotation angle computation portion 202 performs a process of computing the rotation angle θ of the shaft about the long axis thereof with respect to the reference attitude of the golf club 3 by using measured data (acceleration data) output from the sensor unit 10. In the present embodiment, the rotation angle computation portion 202 computes the rotation angle θ by using an acceleration in the x axis direction and an acceleration in the z axis direction measured by the sensor unit 10 when the golf club 3 is at the initial attitude. The rotation angle θ corresponds to angle information included in motion information regarding a swing in the present embodiment.

The inclined angle computation portion 203 performs a process of computing an inclined angle φ with respect to the golf club 3 by using measured data (acceleration data) output from the sensor unit 10. The inclined angle computation portion 203 computes a combined acceleration of an acceleration in the x axis direction, an acceleration in the y axis direction, and an acceleration in the z axis direction measured by the sensor unit 10 when the golf club 3 is at the initial attitude, and computes the inclined angle φ by using the acceleration in the y axis direction and the combined acceleration. The inclined angle φ corresponds to angle information included in motion information regarding a swing in the present embodiment.

Therefore, if the rotation angle θ and the inclined angle φ which are angle information included in motion information regarding a swing in the head of the golf club 3 are known, it is possible to detect a target swing direction which is a hit ball direction. Therefore, the angle information in a swing can be said to be a target direction in the swing.

The initial attitude information generation portion 204 performs a process of generating initial attitude information of the golf club 3 by using the rotation angle θ, the inclined angle φ, and information regarding some or all of the lie angle, the face angle, and the loft angle as the specification of the golf club 3. The initial attitude information of the golf club 3 may include, for example, some or all of the lie angle, the face angle, and the loft angle at address of the user 2.

In the normal mode, the motion analysis portion 205 performs a process of analyzing a swing (first motion information) of the subject 2 by using initial attitude information of the golf club 3 and measured data (acceleration data and angular velocity data) output from the sensor unit 10, so as to generate motion analysis information. In the simple mode, the motion analysis portion 205 performs a process of analyzing a swing (second motion information) of the subject 2 by using measured data (acceleration data and angular velocity data) output from the sensor unit 10, so as to generate motion analysis information.

In the normal mode, specifically, first, the motion analysis portion 205 computes an offset amount by using the measured data (acceleration data and angular velocity data) during a standing still action (at address) of the subject 2, stored in the RAM 240. Next, the motion analysis portion 205 subtracts the offset amount from the measured data stored in the RAM 240 so as to perform bias correction, and computes a position and an attitude of the sensor unit 10 during a swing action of the subject 2 (during the action in step S3 in FIG. 3) by using the bias-corrected measured data. The motion analysis portion 205 may set, for example, an initial position of the sensor unit 10 at the origin (0,0,0) of the XYZ coordinate system, and may compute changes in positions from the initial position of the sensor unit 10 in a time series by integrating acceleration data. The motion analysis portion 205 may set an attitude of the sensor unit 10 when the golf club 3 is at the initial attitude as an input apparatus, and may compute changes in attitudes from the initial attitude of the sensor unit 10 by performing rotation calculation using angular velocity data. An attitude of the sensor unit 10 may be expressed by, for example, rotation angles (a roll angle, a pitch angle, and a yaw angle) around the X axis, the Y axis, and the Z axis, an Euler's angle, or a quaternion.

The signal processing section 120 of the sensor unit 10 may compute an offset amount of measured data so as to perform bias correction on the measured data, and the acceleration sensor 100 and the angular velocity sensor 110 may have a bias correction function. In this case, it is not necessary for the motion analysis portion 205 to perform bias correction on the measured data.

The motion analysis portion 205 defines a motion analysis model (double pendulum model) in which a length or a position of the centroid of the shaft of the golf club 3, an attachment position of the sensor unit 10, features (rigid body) of the golf club 3, or human features (a joint bending direction, and the like) are taken into consideration, and computes a trajectory of the motion analysis model by using information regarding a length or a position of the centroid of the shaft of the golf club 3, a position or an attitude of the sensor unit 10, and information regarding the attachment position of the sensor unit 10 and features (a length of the arms, a position of the centroid, and the like) of the subject 2.

The motion analysis portion 205 detects a timing (impact timing) at which the subject 2 hit the ball in a period of the swing action by using the time information and the measured data stored in the RAM 240. In the present embodiment, the motion analysis portion 205 computes a combined value of the measured data (the acceleration data or the angular velocity data) output from the sensor unit 10, and specifies the timing (time point) at which the user 2 hit the ball on the basis of the combined value. The motion analysis portion 205 computes some or all of the lie angle, the face angle, and the loft angle during ball hitting of the subject 2 by using a position and an attitude of the motion analysis model and some or all of the lie angle, the face angle, and the loft angle as the specification of the golf club 3 during ball hitting (at impact), and generates attitude information (attitude information of the golf club during ball hitting) including such information.

The motion analysis portion 205 generates motion analysis information by using the trajectory of the motion analysis model, or the attitude information of the golf club 3 during ball hitting. The motion analysis information is, for example, a trajectory of a swing (a trajectory of the head of the golf club 3), a rhythm of a swing and a head speed from a backswing to follow-through, an incidence angle (club path) or a face angle during ball hitting, shaft rotation (a change amount of a face angle during a swing), a V zone, and a deceleration rate of the golf club 3, or information regarding a variation in these pieces of information in a case where the subject 2 performs a plurality of swings.

The advice information generation portion 206 performs a process of generating advice information regarding an attitude (address attitude) of the subject 2 by using the initial attitude information of the golf club 3 or the motion analysis information. The advice information may be, for example, information regarding whether or not a hands-forward attitude is taken, information regarding to what extent a hands-forward attitude is taken, information regarding a method for taking (not taking) a hands-forward attitude, and information regarding an ideal address attitude.

Since an ideal address attitude of the subject 2 differs depending on the type of golf club 3, a physical feature or a swing habit of the subject 2, the advice information generation portion 206 may perform predetermined calculation in which information regarding features of the golf club 3 or a trajectory of the motion analysis model is also taken into consideration so as to generate advice information.

The storage processing portion 207 performs read/write processes of various programs or various data for the ROM 230, the RAM 240, and the recording medium 250. The storage processing portion 207 performs a process of storing the time information and the measured data received from the data acquisition portion 201 in the RAM 240 in correlation with each other, and also performs a process of storing the initial attitude information, the motion analysis information, the advice information, and the like in the RAM 240, or a process of storing the information in the recording medium 250 in a case where the information is desired to be stored as a record.

The display processing portion 208 performs a process of displaying various images (including text, symbols, and the like) on the display 260. For example, the display processing portion 208 performs a process of reading the motion analysis information or the advice information stored in the RAM 240 or the recording medium 250 automatically or when a predetermined input operation is performed after a swing action of the subject 2 is completed, and displaying an image for motion analysis or an image for advice on the display 260. The display processing portion 208 may read the initial attitude information or the like stored in the RAM 240 or the recording medium 250, and displaying various images on the display 260. Alternatively, a display may be provided in the sensor unit 10, and the display processing portion 208 may transmit images to the sensor unit 10 via the communication section 210, and various images may be displayed on the display of the sensor unit 10.

A display method in the display 260 will be described later.

The sound output processing portion 209 performs a process of outputting various sounds (including voices, buzzer sounds, and the like) from the sound output section 270. For example, the sound output processing portion 209 may read the motion analysis information or the advice information stored in the RAM 240 or the recording medium 250 automatically or when a predetermined input operation is performed after a swing action of the subject 2 is completed, and may output sounds for motion analysis or sounds for advice from the sound output section 270. The sound output processing portion 209 may read the initial attitude information or the like stored in the RAM 240 or the recording medium 250, and may output various images from the sound output section 270. Alternatively, a sound output section may be provided in the sensor unit 10, and the sound output processing portion 209 may transmit such sounds to the sensor unit 10 via the communication section 210, and may output various sounds from the sound output section of the sensor unit 10.

A vibration mechanism may be provided in the motion analysis apparatus 20 or the sensor unit 10, and various pieces of information may be converted into vibration pieces of information by the vibration mechanism so as to be presented to the subject 2.

Motion Analysis Method

Next, a description will be made of the motion analysis method according to the present embodiment with reference to FIG. 7.

Normal Mode

Figure 7:
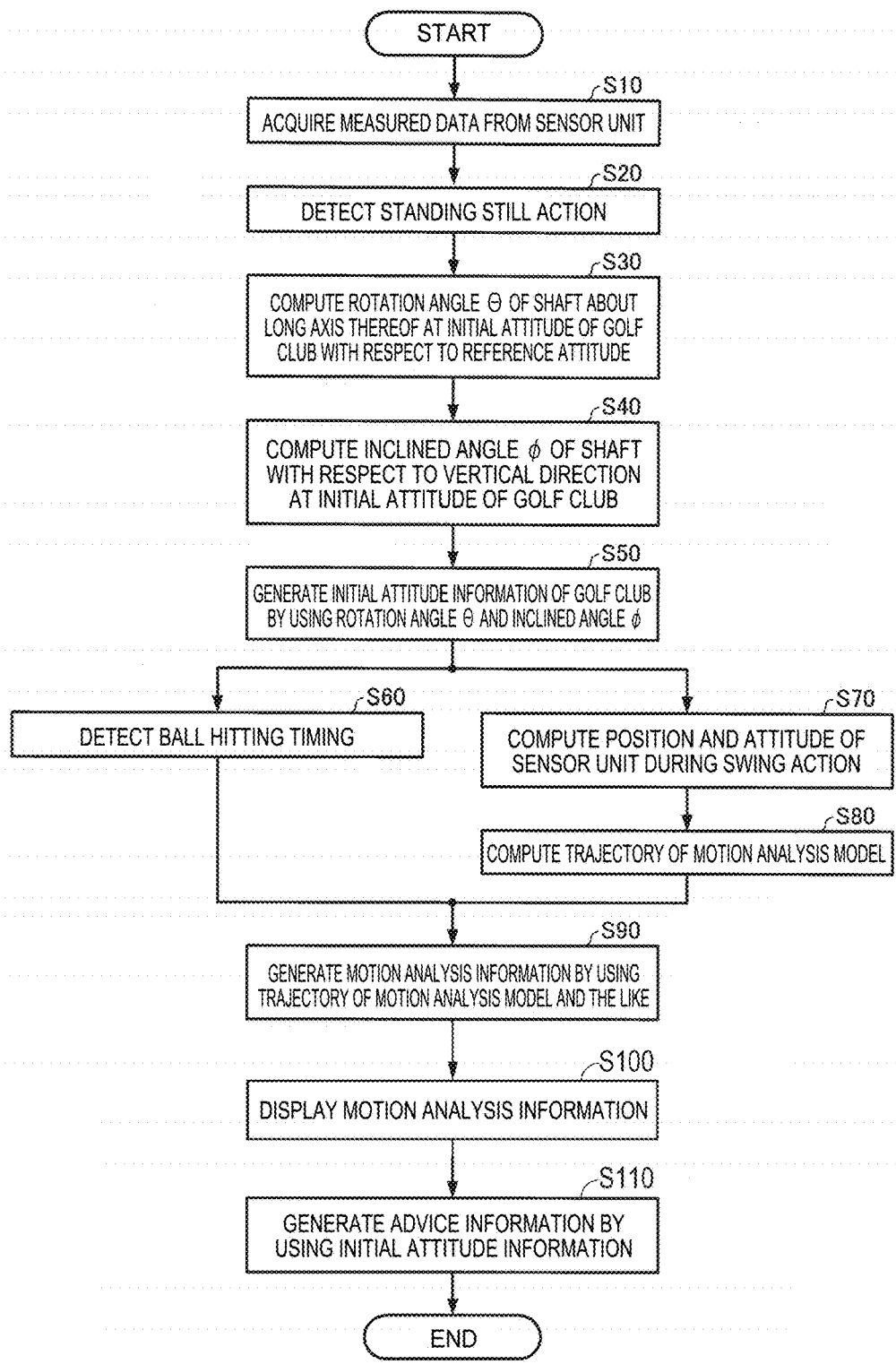
FIG. 7 is a flowchart illustrating examples of procedures of a motion analysis process in the motion analysis method according to the present embodiment.

FIG. 7 is a flowchart illustrating examples of procedures of a motion analysis process performed by the processor 200 in the normal mode.

In the normal mode of the motion analysis method of the present embodiment, as illustrated in FIG. 7, first, the processor 200 acquires measured data in the sensor unit 10 (step S10). If initial measured data in a swing action (including a standing still action) of the subject 2 is acquired in step S10, the processor 200 may perform processes in step S20 and the subsequent steps in real time, and may perform the processes in step S20 and the subsequent steps after part or the whole of a series of measured data in a swing action of the subject 2 is acquired from the sensor unit 10.

Next, the processor 200 detects a standing still action (address action) (the action in step S2 in FIG. 3) of the subject 2 by using the measured data acquired from the sensor unit 10 (step S20). In a case where the process is performed in real time, the processor 200 may output, for example, a predetermined image or sound when the standing still action (address action) is detected, or an LED may be provided in the sensor unit 10, and the LED may be lighted, so that the subject 2 is notified of detection of the standing still action. The subject 2 may confirm the notification and then starts a swing. The standing still action is performed, and thus highly accurate swing analysis can be performed. In this case, display for instructing the subject 2 to perform a standing still action may be performed.

Next, the processor 200 computes the rotation angle θ of the shaft about the long axis thereof at an initial attitude of the golf club 3 with respect to a reference attitude by using the measured data (the measured data during the standing still action (address action) of the subject 2) acquired from the sensor unit 10 (step S30).

Next, the processor 200 computes the inclined angle φ of the shaft with respect to the vertical direction at an initial attitude of the golf club 3 by using the measured data (the measured data during the standing still action (address action) of the subject 2) acquired from the sensor unit 10 (step S40).

The processor 200 computes a lie angle, a face angle, and a loft angle of the subject 2 at address by using the rotation angle θ, the inclined angle φ, and information regarding the lie angle, the face angle, and the loft angle as the specification of the golf club 3, so as to generate initial attitude information of the golf club 3 (step S50).

Next, the processor 200 detects a timing at which the subject 2 hit the ball by using the measured data acquired from the sensor unit 10 (step S60).

The processor 200 performs a processes (step S70) of computing a position and an attitude of the sensor unit 10 during the swing action of the subject 2 and a process (step S80) of computing a trajectory of the motion analysis model on the basis of changes in the position and the attitude of the sensor unit 10, in parallel to the process in step S60. For example, the processor 200 sets an initial position of the sensor unit 10 to the origin of the XYZ coordinate system, specifies a direction of the gravitational acceleration on the basis of acceleration data measured by the sensor unit 10, and computes the initial attitude of the sensor unit 10 in the XYZ coordinate system. Then, the processor 200 computes the position of the sensor unit 10 by integrating acceleration data measured by the sensor unit 10, and also computes the attitude of the sensor unit 10 through rotation computation by using angular velocity data measured by the sensor unit 10. The processor 200 computes the trajectory of the motion analysis model by using the position and the attitude of the sensor unit 10, the specification information of the golf club 3, an attachment position of the sensor unit 10, feature information of the subject 2, and the like.

Next, the processor 200 computes an attitude (a lie angle, a face angle, a loft angle, or the like) of the golf club 3 during ball hitting of the subject 2 by using the trajectory or the motion analysis model or the specification information of the golf club 3, so as to generate motion analysis information (step S90).

Thereafter, display information to be displayed on the display 260 is generated by using the generated motion analysis information (step S100). Here, the display information is, for example, motion information which standardizes angle information in the simple mode on the basis of angle information included in motion information measured in the normal mode, and is output to be displayed on the display 260 or the like with the same coordinate system, so that the normal mode and the simple mode can be easily compared with each other.

Finally, the processor 200 generates advice information regarding an address attitude by using the initial attitude information or the motion analysis information (step S110).

In the flowchart illustrated in FIG. 7, an order of the respective steps may be changed within an allowable range.

Simple Mode

A motion analysis method in the simple mode is a method obtained by excluding the step S20 to step S50 for acquiring initial attitude information and step S110 for generating advice information by using the initial attitude information from the normal mode illustrated in FIG. 7. In other words, step S60 to step S100 are performed by using measured data acquired from the sensor unit 10 in a state in which a standing still action is not detected. Therefore, since the subject does not stand still for a predetermined period of time or more, a measurement time or an analysis time is reduced, and thus a swing can be checked in a short period of time.

Since the motion analysis method of the present embodiment includes the normal mode and the simple mode, measurement in the simple mode is repeatedly performed after measurement in the normal mode is performed, and thus angle information in the simple mode is standardized with angle information included in motion information in the normal mode as a reference such that both of the pieces of angle information can be easily compared with each other. In a case where only the simple mode is repeatedly performed, angle information in a predetermined swing such as an initial swing, a last swing, or an intermediate swing is used as a reference, angle information in other swings is standardized and displayed, and thus swings in the simple mode can be easily compared with each other.

As described above, in the motion analysis method of the present embodiment, since the number of analysis items is smaller in measurement of a swing (second motion information) in the simple mode which is the second mode than in the normal mode which is the first mode for acquiring initial attitude information, the swing (second motion information) can be measured in a shorter period of time than in the normal mode for measuring the swing (first motion information). Thus, since a highly accurate swing analysis result in the normal mode and a swing analysis result in the simple mode measured for a short period of time can be compared with each other in a short period of time, there is an effect that a swing can be corrected in a short period of time.

Since an analysis result of a swing (first motion information) in the normal mode and an analysis result of a swing (second motion information) in the simple mode are output to be displayed on the display 260 with the same coordinate system, both of swing analysis results such as the analysis result of the swing (first motion information) in the normal mode and the analysis result of the swing (second motion information) in the simple mode can be easily compared with each other, and thus a difference between both of the swing analysis results can be easily recognized.

Since angle information included in analysis result of a swing (first motion information) in the normal mode and angle information included in an analysis result of a swing (second motion information) in the simple mode are standardized to be output, both of swing analysis results such as the analysis result of the swing (first motion information) in the normal mode and the analysis result of the swing (second motion information) in the simple mode can be easily compared with each other on the basis of the angle information, and thus a difference between both of the swing analysis results can be easily recognized.

Since the angle information indicates a target direction in a swing, and thus an analysis result of a swing (first motion information) in the normal mode and an analysis result of a swing (second motion information) in the simple mode can be compared with each other with respect to target directions in the swings, and thus a difference between both of the target directions can be easily recognized.

Angle information which is a standardized value is angle information in a predetermined swing such as an initial swing, a last swing, or an intermediate swing, and thus a difference between swings can be easily recognized.

A screen for selecting whether a swing is analyzed in the normal mode or in the simple mode may be output to the display 260 before the standing still action (step S1) in FIG. 3. In a case where such display is not performed, the processor 200 may automatically determine the normal mode or the simple mode.

Display Method

Next, a description will be made of a display method according to the present embodiment with reference to FIGS. 8 to 12.

FIGS. 8 to 12 are diagrams illustrating a display method according to the present embodiment.

Figure 8:
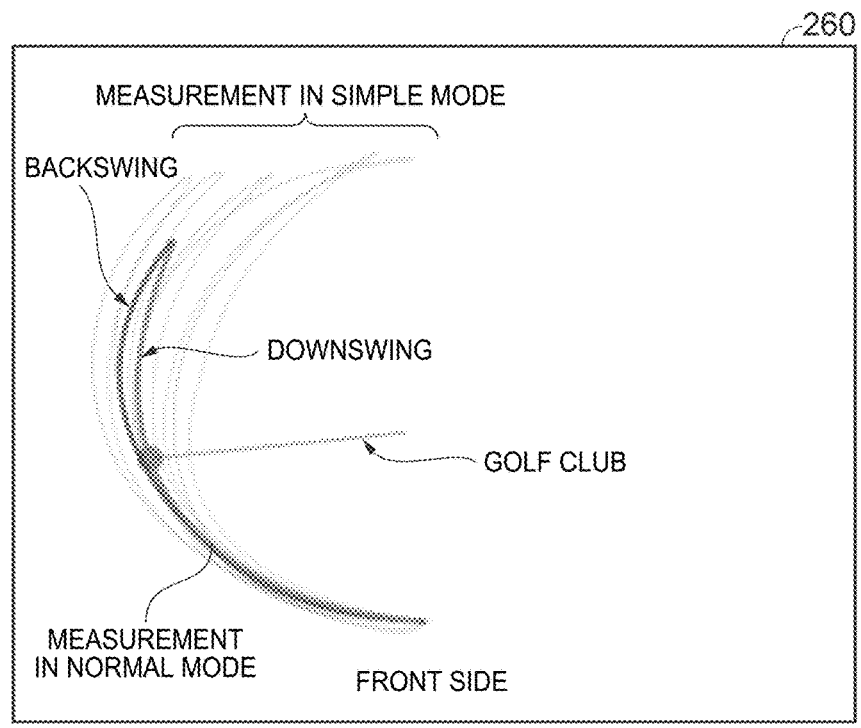
FIG. 8 is a diagram illustrating a display method according to the present embodiment.
Figure 9:
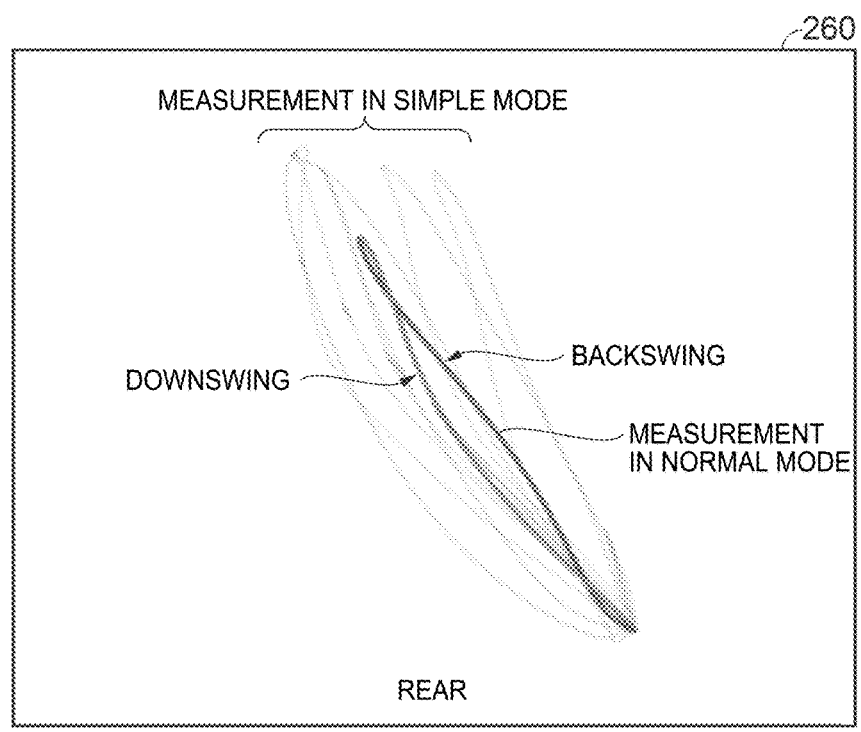
FIG. 9 is a diagram illustrating a display method according to the present embodiment.

FIGS. 8 and 9 illustrate a case where a swing analysis result which is first motion information measured in the normal mode and a swing analysis result which is second motion information measured in the simple mode are displayed in the same coordinate system of the display 260.

FIG. 8 illustrates an example in which swing trajectories (a backswing and a downswing) of the head of the golf club 3 viewed from the front side of the subject 2 are displayed, and a swing analysis result measured in the normal mode and a swing analysis result measured in the simple mode are displayed. FIG. 8 also illustrates an example in which measurement is first performed in the normal mode, and then measurement is performed for a plurality of number of times (as an example, five times) in the simple mode. Here, emphasis display with thick solid lines indicates a swing trajectory in the normal mode, and thin solid lines indicate swing trajectories in the simple mode performed for a plurality of number of times.

In the present embodiment, a position or angle information of the head of the golf club 3 at the time of swing starting measured in each simple mode is standardized and displayed with a position or angle information of the head of the golf club 3 at the time of swing starting measured in the normal mode as a reference. Thus, a swing trajectory in the simple mode can be easily compared with a swing trajectory in the normal mode as a highly accurate analysis result.

Next, FIG. 9 is a diagram in which swing trajectories in the normal mode and the simple mode viewed from an opposite side to a direction of the hit golf ball 4 are displayed. In the same manner as in FIG. 8, a swing trajectory in the normal mode is displayed with a thick solid line in an emphasis manner, and thus it is possible to easily recognize a difference between the swing trajectory in the normal mode and a swing trajectory in the simple mode. In the present embodiment, emphasis display is performed with a line thickness, but is not limited thereto, and a difference may be displayed with a line color difference or a line type (for example, a dotted line or a dashed line).

In the present embodiment, as illustrated in FIGS. 8 and 9, an analysis result (swing trajectory) in the normal mode is displayed in an emphasis manner, but is not limited thereto, and a predetermined swing such as an initial swing, a last swing, or an intermediate swing may be selected and displayed in an emphasis manner.

As mentioned above, since only an analysis result of a predetermined swing is displayed in an emphasis manner, the analysis result of the predetermined swing can be easily checked, and can thus be easily compared with analysis results of other swings.

Figure 10:
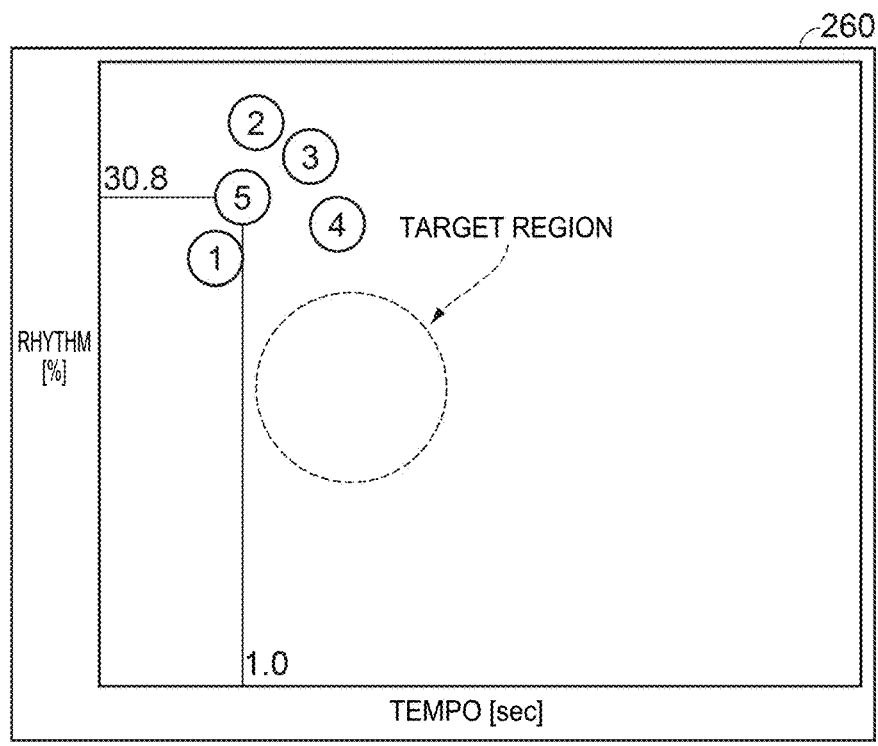
FIG. 10 is a diagram illustrating a display method according to the present embodiment.
Figure 11:
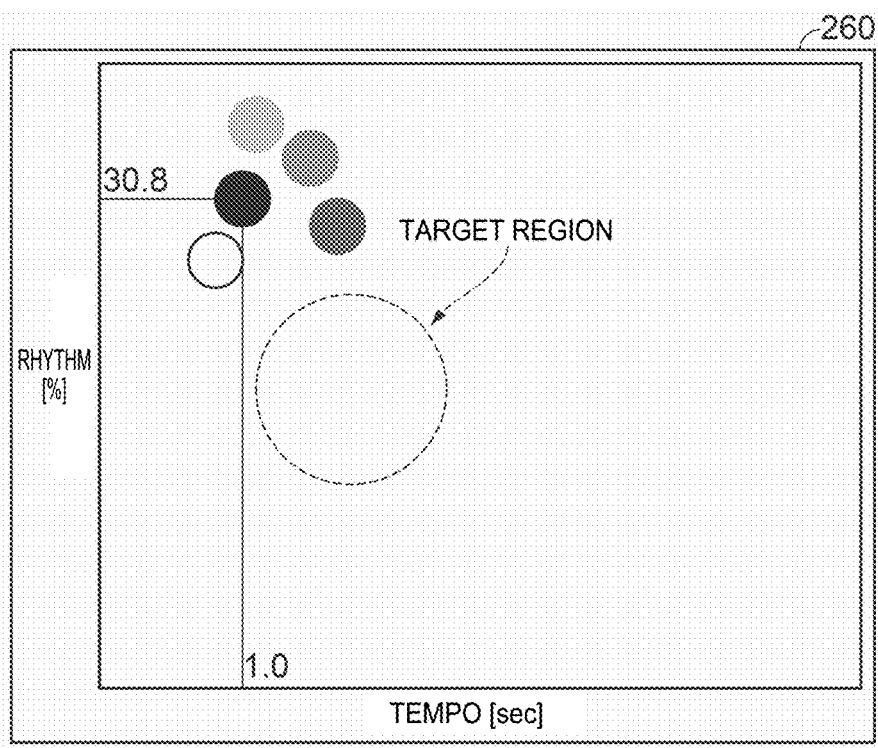
FIG. 11 is a diagram illustrating a display method according to the present embodiment.

Next, the FIGS. 10 and 11 are diagrams in which a relationship between a tempo and a rhythm in a swing among analysis results is displayed on the display 260. FIG. 10 illustrates an example in which an analysis result in each swing order (measurement order) is added with a number and is displayed regardless of the normal mode and the simple mode. Thus, for example, a target is set to a region in a dotted line, and a swing number close to the target can be checked with respect to the swings. The swing order may be displayed by a symbol such as alphabetical letters instead of numbers.

FIG. 11 illustrates an example in which an analysis result in each swing order (measurement order) is displayed with gradations of color, and an initial swing is displayed white, a color is darkened as the number of swings increases, and a last swing is displayed black.

As mentioned above, an analysis result in each swing order is displayed with a number, a symbol, or gradations of color, and thus it is possible to sequentially recognize differences among analysis results from an initial swing to a last swing.

Figure 12:
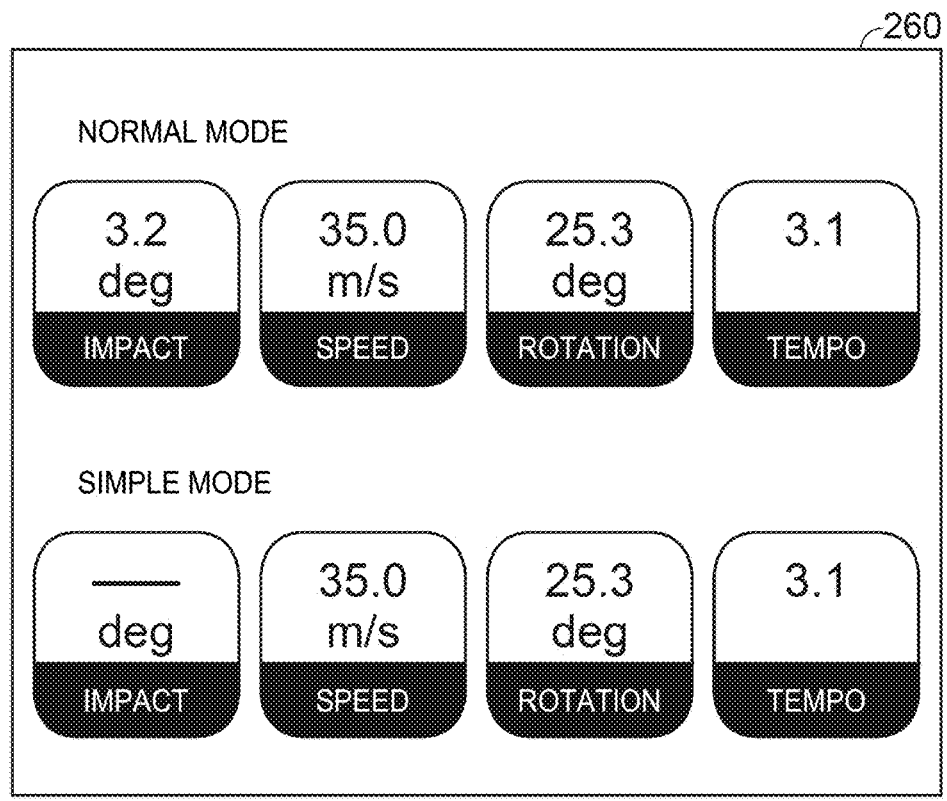
FIG. 12 is a diagram illustrating a display method according to the present embodiment.

Next, FIG. 12 illustrates an example in which impact, a speed, rotation, and a tempo in a swing among analysis results are displayed in numerical values on the display 260. Analysis results in the normal mode and the simple mode are displayed in the same coordinate system of the display 260 in numerical values, and thus a difference between two swings can be easily recognized. With respect to the impact, analysis accuracy in the simple mode is low, and thus a numerical value is not displayed. As mentioned above, an analysis item with low analysis accuracy in the simple mode is known in advance, and thus may not be displayed.

As described above, in the display method of the present embodiment, since a swing analysis result (first motion information) measured in the normal mode and a swing analysis result (second motion information) measured in the simple mode are displayed in the same coordinate system, the swing analysis result in the normal mode and the swing analysis result in the simple mode can be easily compared with each other. In other words, the swing analysis result in the normal mode and the swing analysis result in the simple mode can be viewed together, and can thus be easily compared with each other, so that a difference between both of the swing analysis results can be more accurately recognized.

Since an analysis result (motion information) in a predetermined swing is displayed in an emphasis manner, the analysis result in the predetermined swing can be easily recognized, and can thus be easily compared with analysis results in other swings.

Analysis results (motion information) are displayed with numbers or symbols in a swing order, or analysis results are thinly displayed in a swing order, and thus it is possible to sequentially recognize differences among the analysis results from an initial swing to a last swing.

The invention includes substantially the same configuration (for example, a configuration in which functions, methods, and results are the same, or a configuration in which objects and effects are the same) as the configuration described in the embodiment. The invention includes a configuration in which an inessential part of the configuration described in the embodiment is replaced with another part. The invention includes a configuration which achieves the same operation and effect or a configuration capable of achieving the same object as in the configuration described in the embodiment. The invention includes a configuration in which a well-known technique is added to the configuration described in the embodiment.

The entire disclosure of Japanese Patent Application No. 2017-019306 filed Feb. 6, 2017 is expressly incorporated by reference herein.

What is claimed is:

1. A motion analysis method comprising:
   a first mode in which first motion information in a swing is measured by using an output from an inertial sensor in a state in which a standing still action is detected; and
   a second mode in which second motion information in a swing is measured by using an output from the inertial sensor in a state in which the standing still action is not detected, and the number of analysis items is smaller than in the first mode.

2. The motion analysis method according to claim 1, wherein the first motion information and the second motion information are output in the same coordinate system.

3. The motion analysis method according to claim 1,
wherein angle information included in the first motion information and angle information included in the second motion information are standardized and are output.

4. The motion analysis method according to claim 3,
wherein the angle information indicates a target direction in the swing.

5. The motion analysis method according to claim 3,
wherein the standardized angle information indicates a value of angle information in a predetermined swing.

6. A display method comprising:
a first mode in which first motion information in a swing is measured by using an output from an inertial sensor; and
a second mode in which second motion information in a swing is measured by using an output from the inertial sensor, and the number of analysis items is smaller than in the first mode,
wherein the first motion information and the second motion information are displayed in the same coordinate system.

7. The display method according to claim 6,
wherein each of the first motion information and the second motion information in a predetermined swing is displayed in an emphasis manner.

8. The display method according to claim 6,
wherein a number or a symbol is added to each of the first motion information and the second motion information in an order of the swing.

9. The display method according to claim 6,
wherein each of the first motion information and the second motion information is thinly displayed in an order of the swing.

* * * * *